United States Patent [19]

Willis

[11] 3,742,376

[45] June 26, 1973

[54] VIDEO AMPLIFIERS

[75] Inventor: Donald Henry Willis, Indianapolis, Ind.

[73] Assignee: RCA Corporation, New York, N.Y.

[22] Filed: July 6, 1971

[21] Appl. No.: 159,778

Related U.S. Application Data

[62] Division of Ser. No. 37,780, May 15, 1970, Pat. No. 3,619,488.

[52] U.S. Cl. ........................ 330/21, 330/24, 330/29

[51] Int. Cl. ............................................. H03f 3/04

[58] Field of Search ........................ 330/192, 31, 24, 330/112, 93, 94; 334/40

[56] References Cited

UNITED STATES PATENTS 2,790,035 4/1957 Hylas et al. .................... 330/192 X

*Primary Examiner*—Nathan Kaufman
*Attorney*—Eugene M. Whitacre

[57] ABSTRACT

A transistor video amplifier employs coupling from a collector load potentiometer to an emitter common terminal. The variable arm of the potentiometer is coupled to a peaking capacitor and is further coupled to the emitter electrode through selective networks. At one setting of the potentiometer maximum peaking is obtained by an AC ground provided for the selective networks, and at a second setting the capacitor shunts the collector to depeak the response.

The emitter circuit of a transistor video amplifier includes a contrast control which serves to change the gain of the transistor amplifier while maintaining constant peaking. This is afforded by using a bypass capacitor for increasing gain while further serving to introduce a second resonant circuit in shunt with a first circuit via the same capacitor.

These circuits may also be advantageously combined in a single video amplifier.

6 Claims, 1 Drawing Figure

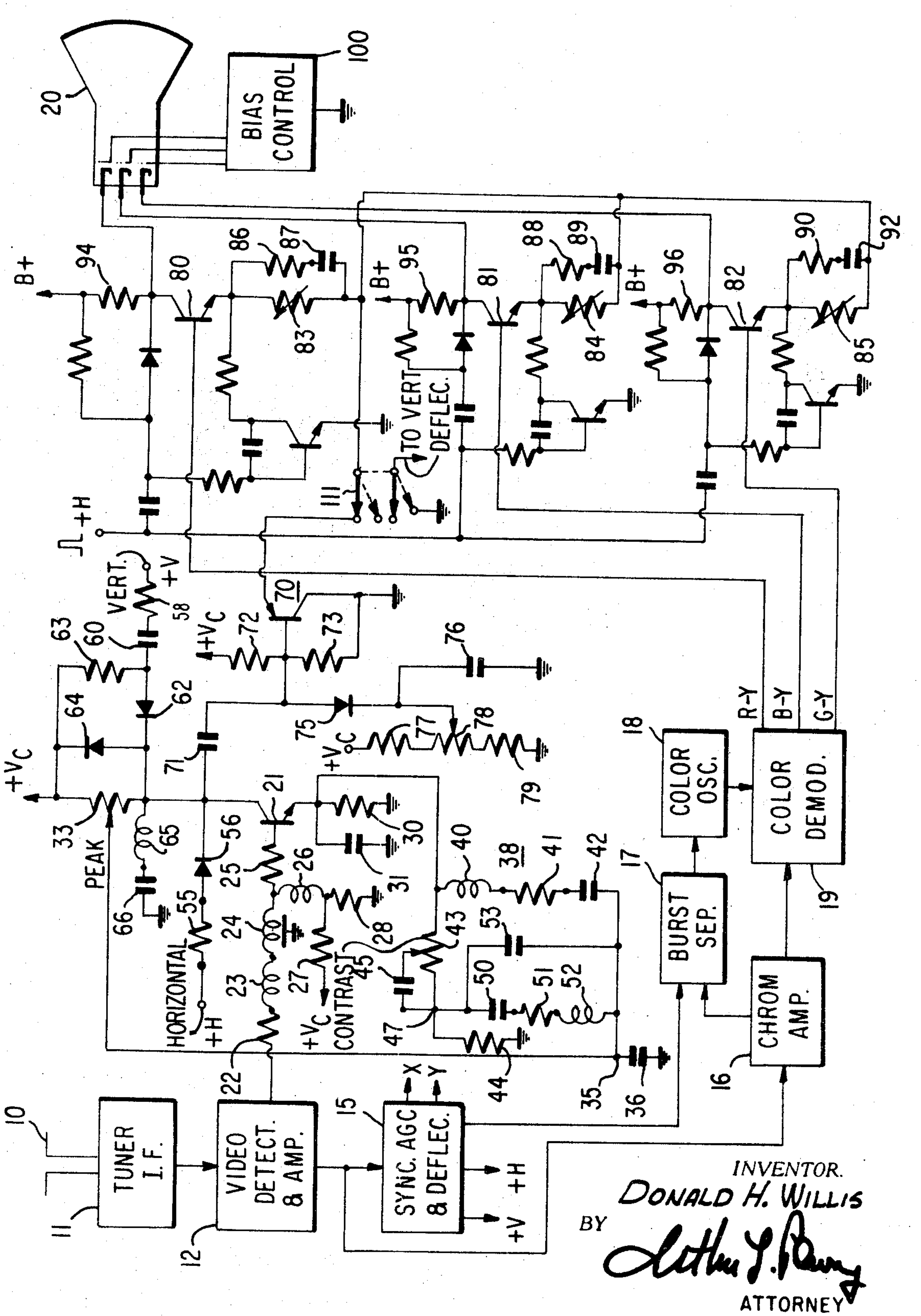
INVENTOR.
DONALD H. WILLIS
BY
ATTORNEY

VIDEO AMPLIFIERS

This is a division of application Ser. No. 37,780, filed May 15, 1970, now U.S. Pat. No. 3,619,488, granted Nov. 9, 1971.

This invention relates to television receivers and more particularly to video amplifier circuits for use therein.

A transistor video amplifier employs coupling from a collector load potentiometer to an emitter common terminal. The variable arm of the potentiometer is coupled to a peaking capacitor and is further coupled to the emitter electrode through selective networks. At one setting of the potentiometer maximum peaking is obtained by an AC ground provided for the selective networks, and at a second setting the capacitor shunts the collector to depeak the response.

The emitter circuit of a transistor video amplifier includes a contrast control which serves to change the gain of the transistor amplifier while maintaining constant peaking. This is afforded by using a bypass capacitor for increasing gain while further serving to introduce a second resonant circuit in shunt with a first circuit via the same capacitor.

The video amplifier features outlined in the previous two paragraphs may also be advantageously combined. The present invention will be described if reference is made to the following specification when read in conjunction with the accompanying sole figure which is a schematic diagram partially in block and circuit form of a television receiver including embodiments according to this invention.

Television antenna 10 which is responsive to a transmitted television signal is coupled to the input of a tuner and an intermediate frequency (I.F.) amplifier 11. Section 11 supplies a video signal to a video detector and amplifier section 12. An output of section 12 is coupled to the sync, AGC and deflection circuitry 15 and to the chrominance amplifier 16. The output terminal of the chrominance amplifier 16 is coupled to a burst separator circuit 17. The burst separator circuit 17 is keyed on during that portion of the horizontal interval containing the color burst signal. The output terminal of the burst separator 17 is coupled to a color oscillator 18 which provides a continuous wave output signal synchronized to the transmitted burst. An output of the chrominance amplifier 16 is also coupled to the input of suitable color or chrominance demodulators 19. Such demodulators 19 serve to demodulate the chrominance signals, as applied thereto via the chrominance amplifier 16, with respect to the phase and frequency of the locked oscillator reference signal. The outputs from demodulator 19 are conventionally called the color difference signals and are labeled R–Y, B–Y and G–Y, respectively. An output of the video detector and amplifier module 12 is applied to the base electrode of a transistor 21 via a path including a resistor 22, an inductor 23, a delay line 24, and resistor 25. Coupled to the junction between resistor 25 and delay line 24 is a biasing network for transistor 21. This biasing network comprises inductor 26 having a terminal coupled to the junction between resistors 27 and 28. The resistors 27 and 28 form a voltage divider between the $+V_C$ supply and reference potential. The emitter electrode of transistor 21 is coupled to the point of reference potential via resistor 30 in shunt with a high frequency compensating capacitor 31. The collector electrode of transistor 21 is coupled to the $+V_C$ supply via a potentiometer 33. The variable tap of potentiometer 33 is coupled to a point of reference potential for AC signals via a capacitor 36. The junction 35 between the variable arm of potentiometer 33 and capacitor 36 is coupled back to the emitter electrode of transistor 21 through a video peaking network 38 including a contrast control 43. The peaking network 38 appears between the collector and emitter electrodes of transistor 21 and its operation will be described subsequently.

Briefly, the emitter electrode of transistor 21 is coupled to the aforementioned junction 35 via a first selective series network comprising the series combination of inductor 40, resistor 41 and capacitor 42. A contrast control network includes the series combination of variable resistor 43 in series with resistor 44 between the emitter electrode of transistor 21 and the point of reference potential. The variable tap of resistor 43 is coupled to one terminal of a bypass capacitor 45 having its other terminal coupled to the junction 47 between resistor 43 and 44. Junction 47 is also coupled to a second series selective network comprising capacitor 50, resistor 51 and indicator 52. This network is coupled between junction 47 and junction 35 and is shunted by a capacitor 53. The operation of the above-described peaking and contrast network 38 will be described subsequently.

The amplifying arrangement including transistor 21, as described above, also serves to accommodate the blanking functions of the receiver. In this manner a horizontal blanking pulse derived from the sync, AGC and deflection circuitry 15 is applied to the collector electrode of transistor 21 via the resistor 55 in series with diode 56. The diode 56 has the cathode coupled to the collector electrode of transistor 21. Vertical blanking is accommodated by applying a vertical wave shape, also derived from circuitry 15, to the collector electrode of transistor 21 via resistor 58 in series with capacitor 60 and diode 62. Thediode 62 has its cathode electrode coupled to the collector electrode of transistor 21. The anode electrode of diode 62 as coupled to capacitor 60 is also coupled to the $+V_C$ supply via resistor 63. The junction formed by the connection of the cathode of diode 62 to the collector electrode of transistor 21 is coupled to the $+V_C$ supply through still another diode 64. Diode 64 thus appears in shunt with variable resistor 33 and has its cathode electrode coupled to the $+V_C$ supply and its anode electrode coupled to the collector electrode of transistor 21. The collector electrode of transistor 21 is further returned to the point of reference potential through the series network including inductor 65 and capacitor 66. The above-described transistor 21 amplifier stage serves to perform luminance amplification, horizontal and vertical blanking, contrast control and video peaking for the entire luminance amplifier chain.

The amplified video signal is applied to the base electrode of an emitter follower transistor 70. The emitter electrode of the follower transistor 70 is coupled to the emitter electrodes of three separate NPN transistors 80, 81 and 82. This applies the luminance signal via the separate drive adjust circuits to the emitter electrodes of the three NPN transistors 80, 81 and 82. Each drive adjust circuit includes a variable resistor 83, 84 and 85 respectively which is in shunt with a respective series RC network 86, 87, 88, 89, 90, 92. The respective collector electrodes of the transistors 80, 81 and 82 are separately returned to the B+ supply respectively via the load resistors 94, 95 and 96.

The base electrodes of transistors 80, 81 and 82 are respectively coupled to the outputs of the color demodulator circuits 19. Accordingly, the R–Y color difference signal is applied to the base electrode of transistor 80, the B–Y to the base electrode of transistor 81, and the G–Y to the base electrode of transistor 82. Thus the above-noted transistors 80, 81 and 82 are driven at their emitter electrodes by the luminance or Y signal and at their base electroe by the appropriate color difference signal. These transistors 80, 81 and 82 therefore provide at their collector electrodes the color signals as the red, green and blue for application directly to the cathode electrodes of the kinescope 20. The grid electrodes of the kinescope 20 are returned to a biasing control network 100 which serves to maintain these electrodes at a suitable operating potential with respect to the quiescent voltage applied to the cathode electrodes of kinescope 20 due to the direct coupling of such electrodes to the respective collector electrodes of transistors 80, 81 and 82.

Details of the matrixing of the luminance signal applied to the base electrode of transistor 70 with the R–Y, B–Y and G–Y color difference signals at the output of the color demodulators 19 to provide signals to the cathodes of kinescope 20 is more fully described in United States Patent 3,619,488.

OPERATION OF THE VIDEO AMPLIFIER INCLUDING TRANSISTOR 21

The luminance signal as applied to the base electrode of transistor 70 contains horizontal and vertical retrace blanking.

To obtain such blanking a horizontal pulse is coupled to the collector electrode of transistor 21 via resistor 55 in series with the diode 56. A positive horizontal pulse as applied thereto forward biases the diode 56 and diode 64 causing the collector electrode of transistor 21 to go positive, or towards $+V_C$. This positive transition is coupled through capacitor 71 to the base electrode of transistor 70 causing the same to operate towards cut off. The reverse biasing of transistor 70 in turn opens the ground return path of transistors 80, 81 and 82, respectively. This action causes current conduction to cease during the blanking pulse causing the collector electrodes of transistor 80 to 82 to go towards B+. This action in turn causes the cathode voltage of the kinescope 20 to go positive, thus cutting off or blanking the same.

During the vertical sync interval a positive vertical pulse is applied via resistor 58 and capacitor 60 to the anode of diode 62 causing diodes 62 and 64 to be forward biased. This action clamps the collector electrode of transistor 21 at the $+V_C$ level during the vertical blanking interval. This action, in turn, causes transistor 70 to go towards cut off which action then raises the cathode potential of the kinescope 20 towards B+, thus again blanking the kinescope in a similar manner as described. It is also noted that due to the polarity of diodes 56 and 62, each diode is in turn reverse biased by the respective vertical and horizontal pulses to prevent intercoupling between the vertical and horizontal circuits. For example, during the pulse of the positive pulse forward biasing diode 62, the cathode of diode 56 goes positive as it is connected to the collector electrode of transistor 21. This voltage transition serves to reverse bias diode 56, thus preventing any vertical signal from being applied to the horizontal circuit. The same action is provided by diode 62 when a horizontal pulse is being applied to the anode of diode 56, which in turn of course prevents horizontal pulses from being directed back to the vertical circuitry. Transistor 21 during the scan interval has the detected video signal applied to its base electrode via the above-described network including the delay line 24 and thus serves as a common emitter amplifier for the video signal. The collector electrode of transistor 21 is coupled to the load resistor 33 which is selected to provide adequate gain for the video signals. As indicated, the load resistor 33 is a potentiometer having its variable arm coupled to a terminal of a capacitor 36 whose other terminal is returned to the point of reference potential. With the variable arm of potentiometer 33 at the top most position or that position where resistor 33 is coupled to the $+V_C$ supply, maximum peaking is provided. This is so as the emitter resistor 30 of transistor 21 in the above-described position as partly bypassed for high frequencies by capacitor 31 is now also bypassed by the additional series peaking network including inductor 40, capacitor 42 and resistor 41. In this position capacitor 36 has one terminal connected to ground as shown and terminal 35 connected to ground as shown and terminal 35 connected to $+V_C$ which is, in essence, also an AC ground. Therefore, maximum selectivity is available, thus increasing the gain of transistor 21 at the resonant frequency of the above-described circuit. Similarly, during top most position of the peaking control, the additional circuits including the contrast control 43 and the resonant circuit comprising inductor 52, capacitor 50, and resistor 51 are also operative to aid in bypassing the emitter electrode of transistor 21 for the higher frequency luminance components. Now assume that the potentiometer is moved to the opposite position corresponding to the collector electrode of transistor 21. At this position capacitor 36 appears between the collector electrode and ground, thus serving as a shunt capacitance to the collector electrode which action serves to reduce the frequency response of the amplifier 21 and therefore provides a depeaking action. At this position the full value of capacitor 36 also serves as the AC ground return for the above-described resonant circuits including, for example, inductors 40 and 52, capacitors 42 and 50, and resistors 41 and 51.

Thus the capacitor 36 as serving in this manner also would tend to raise the resonant frequency response of the above-described series tuned circuits. However, due to the substantial shunting of the collector electrode by the capacitor, the above-described depeaking predominates. This is so as the attempt to provide peaking in the emitter electrode of the transistor 21 by raising the resonant frequency of the selective series networks included therein is relatively ineffective, as the collector load in combination with the shunt capacitor 36 primarily determines the upper response point of the gain versus frequency characteristic.

The service switch 111 is shown in a closed position and as such completes the coupling of the emitter electrode of the luminance follower transistor 70 to the emitter electrodes of the NPN transistors 80 to 81.

In the dashed line position luminance drive is removed and the vertical deflection circuit included in section 15 is disabled. This collapses the raster. Removing the coupling of the emitter electrode of transistor 70 from transistors 80 to 81 also serves to remove blanking as accomplished in the first video amplifier 21.

Blanking in this position is afforded by a horizontal pulse coupled to the collector electrodes of transistors 80, 82, and 81.

OPERATION OF THE CONTRAST CONTROL ASSOCIATED WITH THE VIDEO AMPLIFIER TRANSISTOR 21

The function of a contrast control, in general, is to selectively increase the AC gain of the video amplifier stage. Certain prior art contrast controls operated by bypassing a degenerating resistor in the emitter or cathode circuit of an amplifier, the bypassed position thus afforded full gain for the amplifier. If high frequency peaking circuitry were utilized in the cathode as well, the contrast control would also serve to bypass such circuits and, in essence, eliminate high frequency peaking for full contrast operation. In the circuit shown the contrast control 43 is connected at one end thereof to the emitter electrode of transistor 21 and is returned to a point of reference potential via the resistor 44. Coupled to the junction of resistors 43 and 44 is the aforementioned series resonant circuit including inductor 52, capacitor 50 and resistor 51 in shunt with capacitor 53. The junction 47 is coupled to the adjustable arm of the contrast control 43 via a relatively large capacitor 45, thus forming a bypass for the control 43. As capacitor 45 is moved towards the emitter electrode of transistor 21, it serves to bypass resistor 43 for AC signals, thus eliminating the degeneration otherwise afforded by this resistor. For this position of capacitor 45 the series resonant circuit including inductor 40, resistor 41 and capacitor 42 is placed in parallel with the aforementioned series network including inductor 52 and capacitor 50. This is so as the reactance of the bypassed capacitor 45 is very small for all luminance signals. Placing the two series resonant circuits in parallel for the positioning of capacitor 45 closer to the emitter electrode of transistor 21 causes the peaking at high frequencies to follow the setting of the contrast control 43. For example, in the absence of the series resonant circuit including capacitor 50 and inductor 52, as one moves the contrast control towards maximum contrast position at the emitter electrode of transistor 21, the large value capacitor 45 would serve to bypass and virtually eliminate the effect of all emitter peaking circuitry associated with the amplifier. The increase in AC gain afforded by this contrast position would also be accompanied by a redution in bandwidth as the gain bandwidth factor of an amplifier remains constant. So, at the increased gain position, the bandwidth would be reduced and the peaking would also be eliminated. The elimination of peaking would serve to affect the response of the display as concerning its ability to produce transitions from black to white or vice-versa. In the circuit shown, as the contrast control is moved towards the emitter electrode of transistor 21 corresponding to maximum contrast, the additional peaking network including inductor 52 and capacitor 50 appears in parallel with the aforementioned peaking network. The dual effect serves to preserve the high frequency peaking available at the emitter electrode for this maximum contrast position. Alternatively, as the contrast control is moved to the minimum position, where capacitor 45 has both terminals at junction 47, the resistor 43 serves to isolate the series network including capacitor 50 from the series network including capacitor 42. Tus peaking is primarily afforded by the series network including capacitor 42 and under the control of the above-described collector load and peaking potentiometer 33. It is noted that the above peaking compensation available with contrast control adjustment is independent of the setting of the peaking control 33. What is meant is that for any position of the peaking control 33, as described above, an adjustment of the contrast control 43 serves to retain that peaking afforded by that setting of resistor 33. This is because of the contrast tracking afforded by the two series resonant circuits coupled on either side of the contrast control via capacitor 45.

I claim:

1. An amplifier circuit including an adjustable frequency peaking network, comprising, a. an active device having input, output and common electrodes, said input electrode adapted to receive signals to be amplified, b. a load potentiometer having first and second terminals and an adjustable slider, said first terminal being coupled to said output electrode of said active device, said second terminal adapted for application to a source of operating potential, c. a capacitor coupled between said adjustable slider and a point of reference potential, d. means including a filter network having a resonant characteristic at a prdetermined frequency coupling said adjustable slider of said potentiometer to said common electrode of said active device, whereby when said slider is in a position corresponding to said first terminal said capacitor is shunted between said output electrode and said point of reference potential to reduce the high frequency response of said amplifier and when said slider is in a position corresponding to said second terminal said filter network is substantially grounded for AC signals to bypass said common electrode for said predetermined frequency.

2. The amplifier circuit according to Claim 1 wherein said filter network comprises, a. a first resonant circuit coupled between said common electrode and said slider of said potentiometer, b. means providing an adjustable resistance of AC signals, c. a second resonant crcuit coupled in series combination with said means providing adjustable resistance for said AC signals between said common electrode and said slider of said potentiometer.

3. The amplifier circuit according to claim 1 further comprising, a. first and second unidirectional current conducting devices each having first and second terminals with easy current flow from said first to said second terminal, said first terminal of said first device being coupled to said first terminal of said load potentiometer and said second terminal coupled to said second terminal of said load potentiometer, whereby said first device appears in shunt with said load potentiometer, said second terminal of said second device being coupled to said first terminal of said first device, b. means for applying a first repetitive signal to said first terminal of said second device of a polarity to cause said first and second devices to conduct to thereby bypass said load potentiometer to cause the voltage at said output electrode to increase towards said operating potential during said repetitive interval.

4. The circuit according to claim 3 further including, a. a third unidirectional current conducting device having first and second terminals poled for easy current conduction from said first to said second terminal and having said second terminal coupled to said first terminal of said first device, b. means for applying another repetitive signal to said first terminal of said third device of a polarity to again forward bias said first device and said third device, while reverse biasing said second device to therefore prevent said another repetitive signal from interfering with the aforementioned repetitive signal.

5. In an amplifier having a gain control including a potentiometer having first and second end terminals and an adjustable arm, the path between said first and said second end terminals of which potentiometer is included as a degenerating resistor in the circuitry in common with the input and output circuits of said amplifier, and a capacitor being connected between said first end terminal and said adjustable arm of said potentiometer and thereby serving to selectively bypass any portion of said potentiometer to reduce said degeneration, in combination therewith, a peaking network for substantially constant peaking of said amplifier independent of the setting of said potentiometer, comprising, a. a first resonant circuit coupled between said first end terminal of said potentiometer and an AC signal ground to provide a selective high frequency compensation thereto, b. a second resonant circuit couples between said second end terminal of said potentiometer and said AC signal ground whereby when said capacitor is bypassing said any portion of said degenerating resistor said first and said second resonant circuits are in parallel for AC signals via said capacitor to provide relatively the same high frequency compensation for said circuit as that available when said capacitor is not bypassing said degenerating resistor.

6. An amplifier circuit including an adjustable frequency peaking network, comprising, a. an active device having an input electrode and first and second output electrodes, said input electrode adapted to receive signals to be amplified, b. a potentiometer having first and second terminals and an adjustable slider, said first terminal being coupled to said first output electrode of said active device, said second terminal adapted for application to a point of potential, c. a frequency selective network coupling said variable arm of said potentiometer to said second output electrode of said active device, d. a capacitor coupled between said adjustable slider and a point of reference potential, to provide a shunt path between said first output electrode and said point of potential in a first position of said adjustable slider and to enable said frequency selective network to provide maximum selectivity in a second position of said potentiometer.

* * * * *